United States Patent
Ni et al.

(10) Patent No.: US 11,142,132 B2
(45) Date of Patent: Oct. 12, 2021

(54) VEHICLE RACK

(71) Applicant: FORCOME (ZHEJIANG) CO., LTD., Jinhua (CN)

(72) Inventors: Xiaojun Ni, Jinhua (CN); Chengsheng Fang, Jinhua (CN); Jing Xiong, Jinhua (CN); Jiancheng Wang, Jinhua (CN)

(73) Assignee: FORCOME (ZHEJIANG) CO., LTD., Jinhua Zhejiang (CN)

( * ) Notice: Subject to any disclaimer, the term of this patent is extended or adjusted under 35 U.S.C. 154(b) by 159 days.

(21) Appl. No.: 16/780,852

(22) Filed: Feb. 3, 2020

(65) Prior Publication Data

US 2020/0398764 A1     Dec. 24, 2020

(30) Foreign Application Priority Data

Jun. 21, 2019   (CN) .......................... 201920941138.X

(51) Int. Cl.
*B60R 9/058*     (2006.01)
*B60R 9/045*     (2006.01)
*B60R 9/06*      (2006.01)

(52) U.S. Cl.
CPC .............. *B60R 9/058* (2013.01); *B60R 9/045* (2013.01); *B60R 9/06* (2013.01)

(58) Field of Classification Search
CPC ............ B60R 9/058; B60R 9/045; B60R 9/06
USPC ....................... 224/315, 402, 403, 405; 296/3
See application file for complete search history.

(56) References Cited

U.S. PATENT DOCUMENTS

| | | | | | |
|---|---|---|---|---|---|
| 3,217,449 | A | * | 11/1965 | Levere ...................... | E04G 1/06 52/143 |
| 3,594,035 | A | * | 7/1971 | Ferguson .................. | B60P 3/40 296/3 |
| 4,152,020 | A | * | 5/1979 | Brown ...................... | B60P 3/40 224/403 |
| 4,211,448 | A | * | 7/1980 | Weston ..................... | B60R 9/00 224/325 |
| 4,423,899 | A | * | 1/1984 | Langmead ................ | B60R 9/00 211/182 |
| 4,509,787 | A | * | 4/1985 | Knaack ..................... | B60R 9/00 211/182 |
| 4,600,232 | A | * | 7/1986 | Phillips ................ | B62D 33/044 296/3 |

(Continued)

FOREIGN PATENT DOCUMENTS

GB     2558894 A * 7/2018 ......... B62D 33/0207

*Primary Examiner* — Nathan J Newhouse
*Assistant Examiner* — Lester L Vanterpool
(74) *Attorney, Agent, or Firm* — SZDC Law PC

(57) ABSTRACT

A vehicle rack includes a cargo shelf, the cargo shelf including two beams and two fixing rods; four supporting frames, each beam being provided with two supporting frames that are movable along the beam, the two fixing rods being secured between two corresponding supporting frames on the two beams, a U-shaped plug interface being formed at the top of each supporting frame; a mobile frame that is movable along the beams and is U-shaped, the mobile frame including a horizontal rod and two vertical rods, a U-shaped plug interface I being formed at the top of each vertical rod; six connectors, each connector being provided with a clamping interface that opens through at bottom of the connector so that the connector can clamp the beam from top and then be inserted into the U-shaped plug interface or the U-shaped plug interface I; and six bolts.

6 Claims, 4 Drawing Sheets

(56) References Cited

U.S. PATENT DOCUMENTS

| | | | | |
|---|---|---|---|---|
| 4,659,131 A * | 4/1987 | Flournoy, Jr. | B60R 9/00 | 296/3 |
| 4,676,543 A * | 6/1987 | Lewis | B60R 9/00 | 296/3 |
| 4,770,458 A * | 9/1988 | Burke | B60R 9/00 | 224/405 |
| 4,995,538 A * | 2/1991 | Marengo | B60R 9/045 | 224/315 |
| 5,143,415 A * | 9/1992 | Boudah | B60R 9/00 | 224/325 |
| 5,152,570 A * | 10/1992 | Hood | B60P 3/42 | 296/3 |
| 5,190,337 A * | 3/1993 | McDaniel | B60P 3/42 | 224/405 |
| 5,192,107 A * | 3/1993 | Smith, Sr. | B60P 3/40 | 296/3 |
| 5,476,301 A * | 12/1995 | Berkich | B60P 3/40 | 224/403 |
| 5,494,327 A * | 2/1996 | Derecktor | B60P 3/40 | 224/321 |
| 5,628,540 A * | 5/1997 | James | B60R 9/00 | 211/189 |
| 5,743,702 A * | 4/1998 | Gunderson | B60P 1/5442 | 224/403 |
| 5,806,905 A * | 9/1998 | Moore | B60R 9/00 | 296/3 |
| 5,927,782 A * | 7/1999 | Olms | B60P 3/40 | 296/3 |
| 6,347,731 B1 * | 2/2002 | Burger | B60R 9/00 | 224/402 |
| 6,513,849 B2 * | 2/2003 | Carter | B60P 3/40 | 224/310 |
| 6,752,301 B1 * | 6/2004 | Drolet | B60P 3/40 | 224/403 |
| 7,134,831 B2 * | 11/2006 | Risser | B60P 1/5442 | 414/542 |
| 7,513,548 B1 * | 4/2009 | Win | B60P 3/40 | 224/405 |
| 7,641,251 B1 * | 1/2010 | Stepanians | B60P 3/40 | 296/3 |
| D624,005 S * | 9/2010 | Winner | D12/412 | |
| D638,773 S * | 5/2011 | Laverack | D12/223 | |
| 8,322,582 B2 * | 12/2012 | Flaherty | B60R 9/00 | 224/405 |
| 8,550,527 B1 * | 10/2013 | Win | B60P 3/40 | 296/3 |
| 8,662,366 B1 * | 3/2014 | DeZonia | B60R 9/04 | 224/405 |
| 8,668,125 B2 * | 3/2014 | Williams | B60R 9/06 | 224/405 |
| 8,814,015 B2 * | 8/2014 | Gier | B60R 9/06 | 224/403 |
| 9,132,784 B2 * | 9/2015 | Harrison | B60R 9/045 | |
| 9,566,914 B2 * | 2/2017 | Marr, Jr. | B62D 33/0207 | |
| 9,580,004 B2 * | 2/2017 | Puchkoff | B62D 33/0207 | |
| 9,586,629 B2 * | 3/2017 | Leitner | B60R 11/06 | |
| 9,845,056 B1 * | 12/2017 | Lovas | B60P 3/14 | |
| 10,207,650 B1 * | 2/2019 | Banegas | B62D 33/0207 | |
| 10,259,508 B2 * | 4/2019 | Leitner | B60R 9/06 | |
| 10,421,385 B2 * | 9/2019 | Chambers | B62D 33/023 | |
| D874,383 S * | 2/2020 | Hammer | B60P 3/42 | D12/406 |
| 2004/0026945 A1 * | 2/2004 | Kench | B60R 9/00 | 296/3 |
| 2004/0232718 A1 * | 11/2004 | Kerns | B60R 11/00 | 296/3 |
| 2009/0166390 A1 * | 7/2009 | Flaherty | B60R 9/00 | 224/405 |
| 2010/0183413 A1 * | 7/2010 | Owens | B60P 1/5442 | 414/542 |
| 2015/0197202 A1 * | 7/2015 | Harrison | B62D 33/02 | 296/3 |
| 2015/0258940 A1 * | 9/2015 | Breeden, III | B60R 9/045 | 224/405 |
| 2017/0166105 A1 * | 6/2017 | Puchkoff | B60R 9/06 | |
| 2019/0367101 A1 * | 12/2019 | McFadden | B62D 33/0207 | |

* cited by examiner

VEHICLE RACK

This application claims priority to Chinese Patent Application No.: 201920941138.X, filed on Jun. 21, 2019, which is incorporated by reference for all purposes as if fully set forth herein

TECHNICAL FIELD

This application relates to a transportation device, in particular, a vehicle rack.

BACKGROUND TECHNOLOGY

Automobiles have limited length and width. In order to facilitate the transport of some longer items, it is necessary to add a rack on the automobiles.

Existing vehicle racks are generally composed of cargo shelf, mobile rod on cargo shelves, four supporting frames fixed at the bottom of cargo shelves and fixing connectors fixed on the supporting frames. Because the cargo shelves are integrated, the supporting frame position at the bottom of the existing cargo shelves is fixed. When the length of the automobile is different from the distance between the two supporting frames, one supporting frame cannot be fixed. At the same time, the existing supporting frame and the cargo racks are often connected with too many bolts, so it is inconvenient to disassemble and install racks. Moreover, the width of the existing vehicle rack is not adjustable. If the width of the vehicle does not match the width of the vehicle rack, it can only be solved on the vehicle rack by rotating the supporting frame. This results the width of the upper end of the shelf on both sides is larger than the width of the lower end, or the width of the upper end is smaller than the width of the lower end. Such installation is not desirable. There is a need for adjustable vehicle rack that is easy to assemble and disassemble.

SUMMARY OF THE INVENTION

In one embodiment, the present application provides a vehicle rack. The vehicle rack includes: a cargo shelf, the cargo shelf including two beams and two fixing rods; four supporting frames, each beam being provided with two supporting frames that are movable along the beam, the two fixing rods being secured between two corresponding supporting frames on the two beams, a U-shaped plug interface being formed at the top of each supporting frame; a mobile frame that is movable along the beams and is U-shaped, the mobile frame including a horizontal rod and two vertical rods, a U-shaped plug interface I being formed at the top of each vertical rod; six connectors, each connector being provided with a clamping interface that opens through at bottom of the connector so that the connector can clamp the beam from top and then be inserted into the U-shaped plug interface or the U-shaped plug interface I; and six bolts, each blot passing through one of the supporting frames at the U-shaped plug interface and one of the connectors at the U-shaped plug interface I or passing through one of the vertical rods of the mobile frame at the U-shaped plug interface and one of the connectors at the U-shaped plug interface I, the beams and the supporting frames being securely connected, the beams and the mobile frame being securely connected, the clamping of the connectors being controlled by tightening the bolts, the bolts being located below the bottom of the beams.

In another embodiment, each connector includes a right angle clamping block on a top thereof and extending outwards, the right angle clamping block clamping an outside of one of the supporting frames or one of the vertical rods of the mobile frame.

In another embodiment, the vehicle rack further includes two clamping devices; each supporting frame includes a through hole; one fixing rod passes through the through holes on two supporting frames; the two clamping devices securely connects the one fixing rod and the two supporting frames; each clamping device includes a body, a plug block extending from one side of the body, a clamping interface I, and a clamping device bolt; the clamping interface I of the clamping device clamps the one fixing rod, and the plug block of the clamping device inserts into the through hole of the supporting frame; and the clamping device bolt passes through both side of the clamping interface I to secure the fixing rod.

In another embodiment, the vehicle rack further includes two quick release devices; each quick release device includes a socket, a quick release bolt, a knob, the socket being U-shaped, one side of socket the directly connected with one supporting frame, the knob being screwed to the quick release bolt; and the socket includes a clamping interface II and a bolt groove.

In another embodiment, each quick release device includes a plug connector and the plug connector includes a clamping interface III; each plug connector clamps one end of one fixing rod through the clamping interface III and inserts into the clamping interface II of the socket; and the quick release bolt passes through the bolt groove to connect the fixing rod and the supporting frame, the quick release bolt being under the fixing rod.

In another embodiment, the vehicle rack further includes four fixing connectors; each fixing connector includes a connecting plate, a connecting seat, a bolt sleeve, two fastening bolts and two pressing plates; the connecting plate is an iron plate with a right angle folded edge; one end of the connecting plate connects with the connect seat, and the other end of the connecting plate is provided with two bolt sleeves; the pressing plates are a right angle plate, one end of the pressing plates connecting with the bottom of the connecting plate, the other end of the pressing plates being provided bolt holes; the fastening bolts pass through the bolt sleeves and the bolt holes and connect with a top of an automobile; and the connecting seat connects with one supporting frame.

Compared with the conventional vehicle racks, the present application has the advantages: the whole vehicle rack can be easily to assemble and disassemble. At the same time, the width of the whole vehicle rack can be adjusted. The position of the supporting frames and the mobile frame can also be adjusted. This is suitable for more types of automobile, and at the same time, it is convenient to load goods and avoid injuries.

It is to be understood that both the foregoing general description and the following detailed description are exemplary and explanatory and are intended to provide further explanation of the invention as claimed.

BRIEF DESCRIPTION OF THE DRAWINGS

The drawings forming part of the present application are used to provide a further understanding of the present application. The illustrative embodiments and its explanation are used to explain the present application, which does not constitute an improper limitation on the present application. In the drawings.

REFERENCE NUMERALS DRAWING

Figure 1:
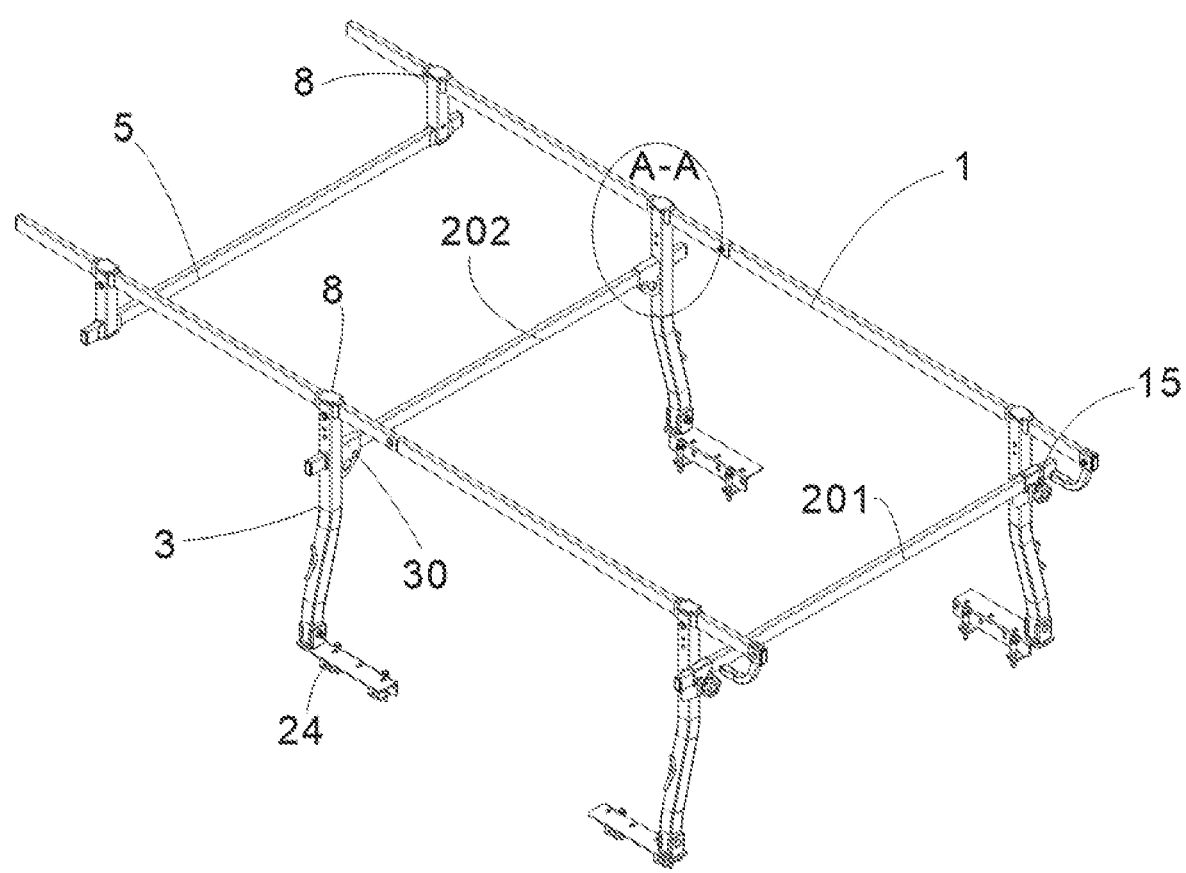
FIG. 1 is a schematic diagram of the structure of a vehicle rack described in this application.

Reference numerals drawing: 1. beam; 201. front fixing rod; 202. rear fixing rod; 3. supporting frame; 4. U-shaped plug interface; 5. mobile frame; 6. vertical rod; 7. U-shaped plug interface I; 8. connector; 9. clamping interface; 10. right angle clamping block; 101. bolt; 11. through hole; 12. body; 13. plug block; 14. clamping interface I; 15. quick release device; 16. socket; 17. quick release bolt; 18. knob; 19. bolt groove; 20. bolt hole; 21. clamping interface II; 22. plug connector; 23. clamping interface III; 24. fixing connector; 25. connecting plate; 26. connecting seat; 27. bolt sleeve; 28. fastening bolts; 29. press plate; 30. clamping device; 31. horizontal rod.

DETAILED DESCRIPTION OF THE ILLUSTRATED EMBODIMENTS

Reference will now be made in detail to embodiments of the present invention, example of which is illustrated in the accompanying drawings.

In the description, it is necessary to understand that the terms "center", "top", "bottom", "left", "right", "vertical", "horizontal", "inside", "outside", "bottom", "top" and other indicative orientation or position relations are based on the orientation or position relations shown in the drawings. This is intended only for the convenience of describing and simplifying the description of the present application, and is not intended to indicate or imply that the device or element referred to must have a specific orientation, or be constructed and operated in a specific orientation, and therefore cannot be understood as a limitation on the new form of the utility.

Implementation Example

Referring to FIG. 1, a vehicle rack provided by this embodiment includes a cargo shelf, four supporting frames 3, one mobile frame 5 and six connectors 8. The cargo shelf includes two beams 1 and two fixing rods 201 and 202. In order to distinguish two fixing rods, the fixing rode in the front is the front fixing rode 201, and the other one is the rear fixing rode 202. The two beams mentioned above are set oppositely back-to-front. There are four supporting frames 3, and two supporting frames 3 are fixed on each beam 1. The fixing rod connects the supporting frames 3. The mobile frame 5 is also fixed between the two beams 1. The connectors 8 are used to connect the supporting frames 3 with the beams 1 and the mobile frame 5 with the beams 1.

Figure 2:
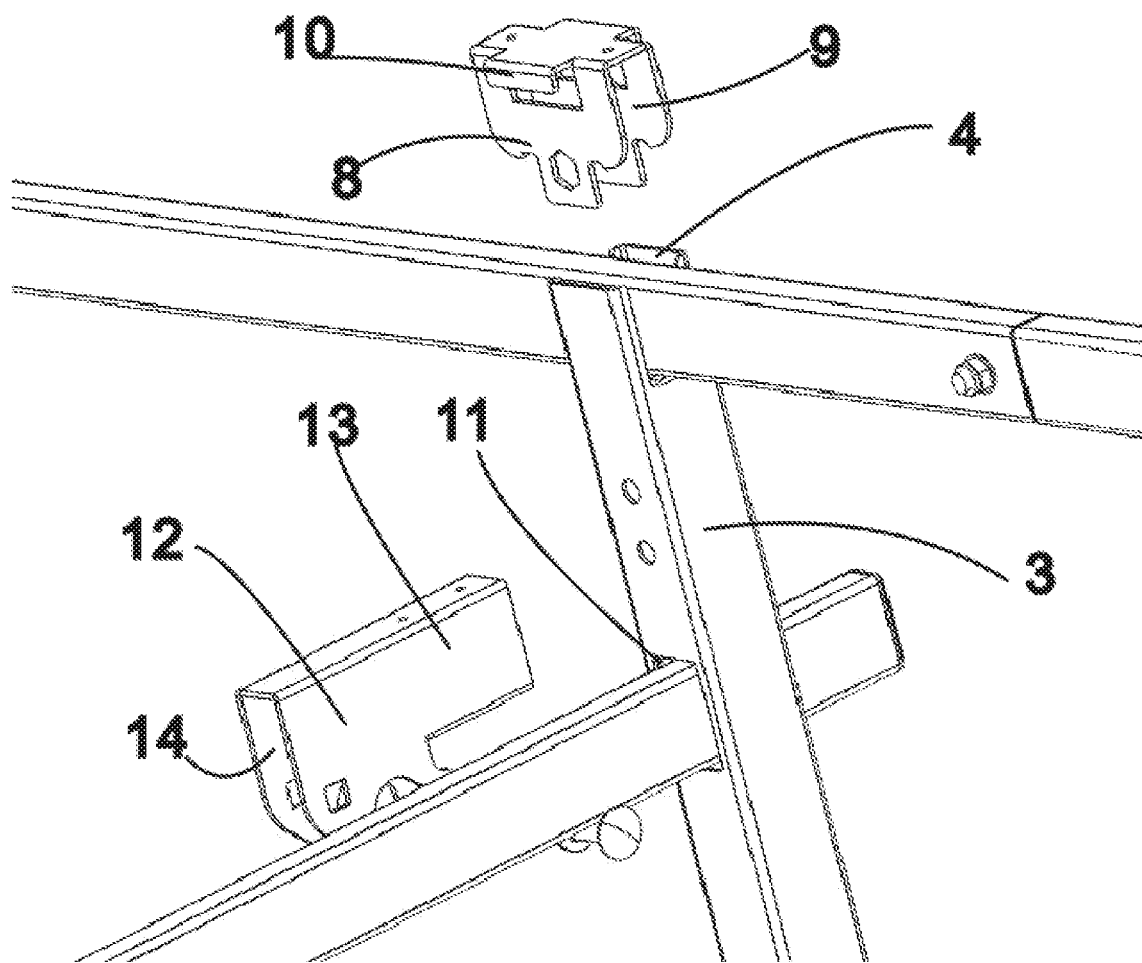
FIG. 2 is a partial schematic diagram at FIG. 1A-A.

Combining with FIG. 2, it is further illustrated that there is a horizontal U-shaped plug interface 4 at the top of the supporting frame 3. The bottom of the connector 8 is provided with a horizontal clamping interface 9. The clamping interface 9 of connector 8 is facing down and clamps on the outside of beam 1 through the clamping interface 9. Meanwhile, the bottom of connector 8 is inserted into the U-shaped plug interface 4. The bolts 101 are fixed by nuts after passing through the supporting frames 3 at the U-shaped plug interface 4 and the connectors 8. The nuts and connectors 8 can be connected by welding. The connector 8 clamps the beam 1 by fastening the bolt 101. At the same time, the bolts 101 in connectors 8 are attached to the bottom of beam 1. There is a right angle clamping block 10 extending outwards on the front and rear sides from the top of the connector 8. The right angle clamping block 10 clamps the outside of supporting frame 3. This design is designed to be waterproof. Also shown in FIG. 2, there is also a through hole 11 on the supporting frame 3. The through hole 11 is used for the insertion of fixing rods 201 and 202. After a fixing rod is inserted in the through hole 11, the clamping device 30 is used to connect the fixing rod and supporting frame 3. The clamping device 30 includes a body 12, a plug block 13, a clamping interface I 14, and a clamping device bolt. The height of the body 12 is higher than that of the plug block 13. The clamping interface I 14 is provided at the bottom of the clamping device 30. The clamping interface I 14 makes the clamping device 30 a thin piece. The connector 8 is also thin piece. The clamping device 30 clamps on the rear fixing rod 202. The plug block 13 is inserted in the through hole 11, and the body 12 is reached against the supporting frame 3. Meanwhile, the plug block 13 is welded with supporting frame 3. The clamping device bolt passes through the body 12 to enable clamping device 30 to clamp the fixing rod 202. In this way, the cargo shelf width is defined. Of course, the clamping device bolt also needs to be attached to the bottom of rear fixing rod 202.

Figure 3:
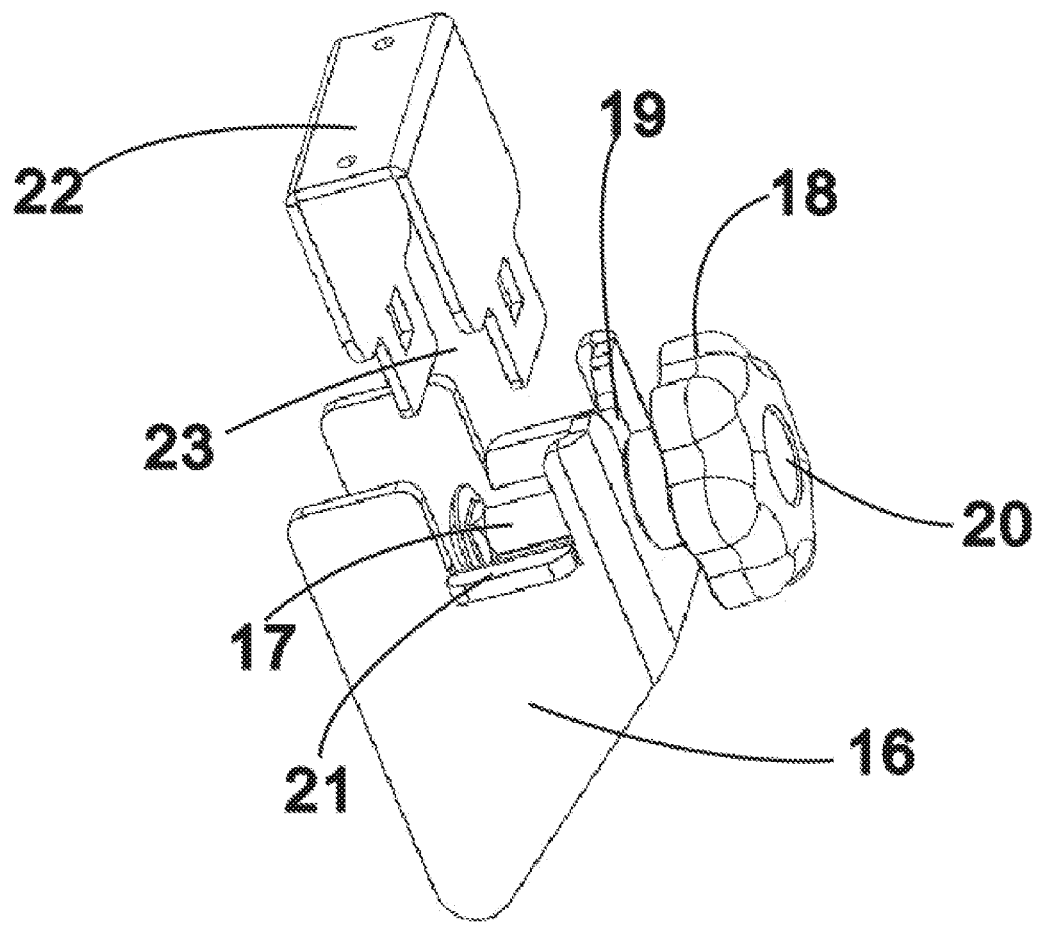
FIG. 3 is a schematic diagram of a quick release device.

FIG. 3 shows the structure of the quick release device 15, which is used to movably fix the front fixing rod 201 between the two opposite supporting frames 3 on the right side. The quick release device 15 includes socket 16, quick release bolt 17, and knob 18. The socket 16 is U-shaped. The open side of the socket 16 is fixed horizontally with the supporting frame 3. The right top of the socket 16 is provided with a clamping interface II 21 for connecting the front fixing rod 201. There is a bolt groove 19 at the top of the socket 16. Meanwhile, the knob 18 has a bolt hole 20 in the center. The knob 18 is screwed with the quick release bolt 17 through the bolt hole 20. The left side of the quick release bolt 17 passes through the bolt groove 19 to directly reach the supporting frame 3 tightly. The front fixing rod 201 is on the top of the quick release bolt 17, and is close to the quick release bolt 17. The structure here can also be that the quick release bolt 17 has not passed through the bolt groove 19 and front fixing rod 201 from the side connects the bolt hole 20 and reaches the supporting frame 3. At the same time, plug connector 22 can be added to the above quick-release device 15. The plug connector 22 has a clamping interface III 23 at the bottom, and the plug connector 22 is stuck on the outside of the front fixing rod 201 through the clamping interface III 23. Meanwhile, the plug connector 22 is stuck in the socket hole II 21. The quick release bolt 17 has not passed through the bolt groove 19 and plug connector 22 from the fixed side of bolt hole 20 and reached the supporting frame 3.

Figure 4:
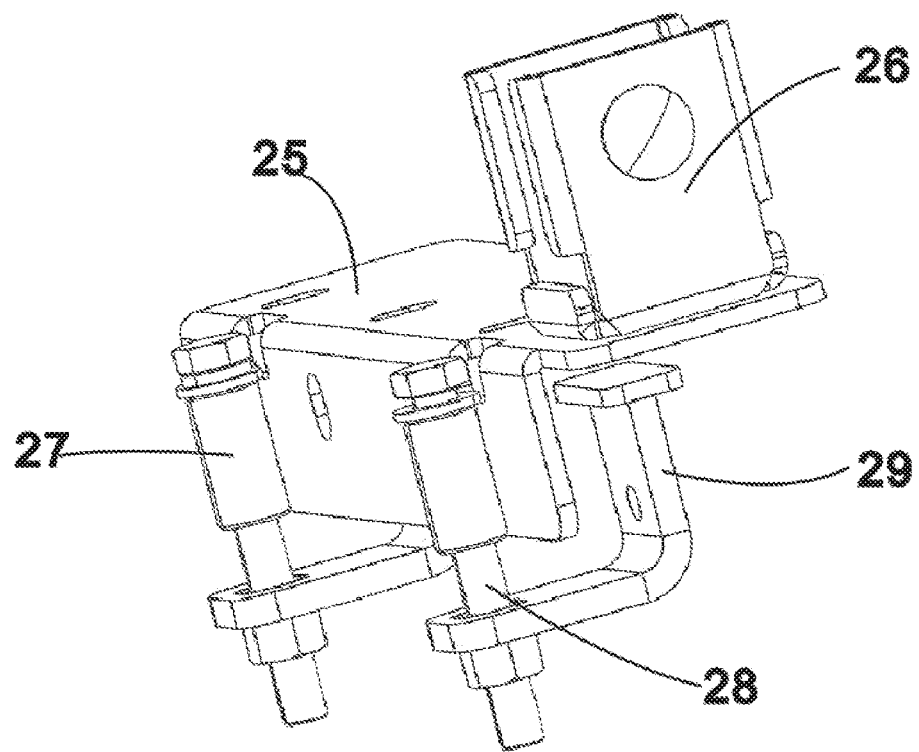
FIG. 4 is a schematic diagram of a fixing connector.

FIG. 4 shows that the vehicle rack includes four fixing connectors 24. Each connector 24 connects the bottom of the supporting frame 3. The fixing connectors 24 on a single beam 1 are opposite. The fixing connector 24 includes connecting plate 25, connecting seat 26, bolt sleeve 27, fastening bolt 28, and pressing plate 29. The connecting plate 25 is a right angle folded iron plate, on which the connecting seat 26 is attached. Two opposite bolt sleeves 27 are fixed on the left outer wall of the bottom end of the connecting plate 25. The pressing plate 29 is also a right-angled pressing plate. The pressing plate 29 is provided at the bottom of the connecting plate 25. The inner folding angle of the pressing plate 29 is opposite to the inner folding angle of the connecting plate 25. The left end of the pressing plate 29 is provided with a fastening bolt hole. The fastening bolt 28 is screwed through nuts after inserting bolt sleeve 27 from top to bottom and through the fastening bolt holes of pressing plate 29. The connecting plate 25 is used to press against the edge frame of the automobile. The pressing plate 29 is under the edge frame, and is fixed to the edge frame by fastening bolts and nuts.

Figure 5:
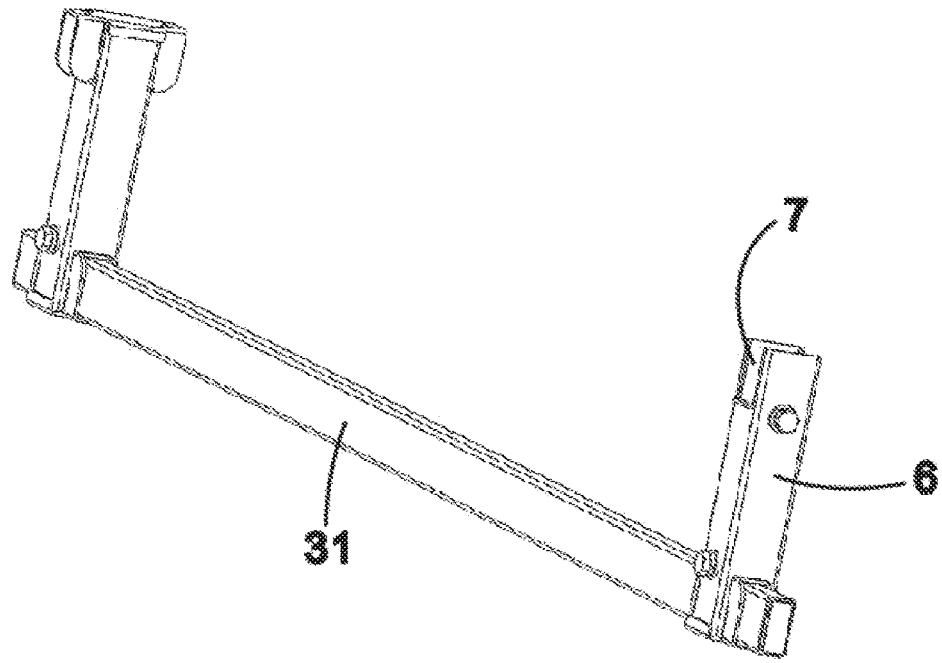
FIG. 5 is a schematic diagram of a mobile frame structure.

FIG. 5 shows that the mobile frame 5 includes two vertical rods 6 and one horizontal rod 31 inserted at the bottom of two vertical rods 6. The two vertical rods 6 can move along the horizontal rod 31. At the same time, the top of the two vertical rods 6 is provided with a U-shaped plug interface I for inserting the connector 8. The mobile frame 5 is connected in the same way as the supporting frame 3. At the same time, the right angle clamping block 10 on connector 8 is on the outside of vertical rod 6.

The beam 1 is preferably a square pipe. The beam 1 is inserted through the connector 8. The connector 8 is inserted on the support frame 3 and connected with the supporting frame 3 through a bolt. When the bolt is loosened, the supporting frame 3 and the connector 8 can move along the cross beam 1. The spacing between the supporting frame 3 can be adjusted according to the length of the vehicle. After adjustment, just screw the bolt so that the connector 8 locks the beam 1 and the supporting frame 3. The adjustment and release are convenient. Because the two ends of the rear fixing rod 202 and the supporting frame 3 are fixed through the clamping device 30, the tightness can be adjusted by clamping device 30. The spacing between the supporting frame 3 and the two beams 1 can be adjusted according to the width of the vehicle. Because the two ends of the front fixing rod 201 are inserted into the plug connector 22, the distance between the two outer supporting frame 3 can be adjusted according to the width of the vehicle. The front fixing rod 201 is locked by quick release bolt 17 and knob 18, while the plug connector 22 and socket 16 are locked. The front fixing rod 201, together with the socket 22, quick release bolt 17 and knob 18, is pulled out from the socket 16, which is very convenient for disassembly or release. The mobile frame 5 can be moved and fixed along the beam 1 at will according to the length of the goods by adjusting a bolt through the connection of connector 8, which is flexible and convenient to use. At the same time, with the clamping device 30 and quick release device 15, the whole shelf width of the vehicle can be adjusted, which is convenient for transport vehicles of various widths. Fastening bolt 28 of fixing seat 24 passes through bolt sleeve 27 from top to bottom to tighten pressure plate 29.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A vehicle rack comprising:
   a cargo shelf, the cargo shelf including two beams and two fixing rods;
   four supporting frames, each beam being provided with two supporting frames that are movable along the beam, the two fixing rods being secured between two corresponding supporting frames on the two beams, a U-shaped plug interface being formed at the top of each supporting frame;
   a mobile frame that is movable along the beams and is U-shaped, the mobile frame including a horizontal rod and two vertical rods, a U-shaped plug interface I being formed at the top of each vertical rod;
   six connectors, each connector being provided with a clamping interface that opens through at bottom of the connector so that the connector can clamp the beam from top and then be inserted into the U-shaped plug interface or the U-shaped plug interface I; and
   six bolts, each bolt passing through one of the supporting frames at the U-shaped plug interface and one of the connectors at the U-shaped plug interface I or passing through one of the vertical rods of the mobile frame at the U-shaped plug interface and one of the connectors at the U-shaped plug interface I, the beams and the supporting frames being securely connected, the beams and the mobile frame being securely connected, the clamping of the connectors being controlled by tightening the bolts, the bolts being located below the bottom of the beams.

2. The vehicle rack according to claim 1, wherein each connector includes a right angle clamping block on a top thereof and extending outwards, the right angle clamping block clamping an outside of one of the supporting frames or one of the vertical rods of the mobile frame.

3. The vehicle rack according to claim 1, wherein
   the vehicle rack further comprises two clamping devices;
   each supporting frame includes a through hole;
   one fixing rod passes through the through holes on two supporting frames;
   the two clamping devices securely connects the one fixing rod and the two supporting frames;
   each clamping device includes a body, a plug block extending from one side of the body, a clamping interface I, and a clamping device bolt;
   the clamping interface I of the clamping device clamps the one fixing rod, and the plug block of the clamping device inserts into the through hole of the supporting frame; and
   the clamping device bolt passes through both side of the clamping interface I to secure the fixing rod.

4. The vehicle rack according to claim 1, wherein
   the vehicle rack further comprises two quick release devices;
   each quick release device includes a socket, a quick release bolt, a knob, the socket being U-shaped, one side of socket the directly connected with one supporting frame, the knob being screwed to the quick release bolt; and
   the socket includes a clamping interface II and a bolt groove.

5. The vehicle rack according to claim 4, wherein
   each quick release device includes a plug connector and the plug connector includes a clamping interface III;
   each plug connector clamps one end of one fixing rod through the clamping interface III and inserts into the clamping interface II of the socket; and
   the quick release bolt passes through the bolt groove to connect the fixing rod and the supporting frame, the quick release bolt being under the fixing rod.

6. The vehicle rack according to claim 1, wherein
   the vehicle rack further comprises four fixing connectors;
   each fixing connector includes a connecting plate, a connecting seat, a bolt sleeve, two fastening bolts and two pressing plates;
   the connecting plate is an iron plate with a right angle folded edge;

one end of the connecting plate connects with the connect seat, and the other end of the connecting plate is provided with two bolt sleeves;

the pressing plates are a right angle plate, one end of the pressing plates connecting with the bottom of the connecting plate, the other end of the pressing plates being provided bolt holes;

the fastening bolts pass through the bolt sleeves and the bolt holes and connect with a top of an automobile; and the connecting seat connects with one supporting frame.

\* \* \* \* \*